(12) United States Patent
He

(10) Patent No.: US 12,221,070 B1
(45) Date of Patent: Feb. 11, 2025

(54) VEHICLE ROOF RACK

(71) Applicant: Zhijun He, Hubei (CN)

(72) Inventor: Zhijun He, Hubei (CN)

( * ) Notice: Subject to any disclaimer, the term of this patent is extended or adjusted under 35 U.S.C. 154(b) by 0 days.

(21) Appl. No.: 18/776,272

(22) Filed: Jul. 18, 2024

(51) Int. Cl.
*B60R 9/045* (2006.01)

(52) U.S. Cl.
CPC .................................... *B60R 9/045* (2013.01)

(58) Field of Classification Search
CPC ....................................................... B60R 9/045
See application file for complete search history.

(56) References Cited

U.S. PATENT DOCUMENTS

| | | | | |
|---|---|---|---|---|
| 4,650,383 A * | 3/1987 | Hoff | ........................... | B60P 7/15 410/152 |
| 5,143,415 A * | 9/1992 | Boudah | ..................... | B60R 9/00 224/325 |
| 5,340,007 A * | 8/1994 | Jeuffray | .................. | B60R 9/045 224/325 |
| 8,668,125 B2 * | 3/2014 | Williams | .................. | B60R 9/06 224/403 |
| 10,507,874 B2 * | 12/2019 | Crandall | ............ | B62D 33/0207 |
| 10,800,464 B2 * | 10/2020 | Binley | ....................... | B60R 9/06 |
| 11,072,376 B2 * | 7/2021 | Condon | ............. | B62D 33/0207 |
| 11,459,038 B2 * | 10/2022 | Schuling | ............... | B60P 7/0815 |
| 11,641,955 B2 * | 5/2023 | Weis | ......................... | B62B 3/04 211/207 |
| 2010/0072237 A1 * | 3/2010 | Green | ........................ | B60R 9/00 296/3 |
| 2017/0036612 A1 * | 2/2017 | Johnson | ................. | B60R 9/0485 |
| 2018/0215322 A1 * | 8/2018 | D'Angelo | ............... | B60R 9/045 |
| 2020/0001797 A1 * | 1/2020 | Chen | ....................... | B62D 33/02 |
| 2022/0177053 A1 * | 6/2022 | Green | ................. | B62D 33/0207 |
| 2023/0108330 A1 * | 4/2023 | Azzam | ...................... | B60R 9/06 224/405 |
| 2023/0286444 A1 * | 9/2023 | Kuschmeader | ............ | B60R 9/00 |
| 2024/0101039 A1 * | 3/2024 | Warech | .................... | B60R 9/045 |

\* cited by examiner

*Primary Examiner* — Brian D Nash

(57) ABSTRACT

A vehicle roof rack is provided and includes: a first cross rod and a second cross rod. The first cross rod includes a first connection end and a first mounting end. The second cross rod includes a second connection end and a second mounting end. The first connection end includes a plurality of first connection portions, the second connection end is selectively connected to any one of the plurality of first connection portions to adjust a distance between the first connection end and the second connection end.

20 Claims, 12 Drawing Sheets

VEHICLE ROOF RACK

TECHNICAL FIELD

The present disclosure relates to the field of articles for vehicles, and in particular to a vehicle roof rack.

BACKGROUND

A vehicle roof rack is a component that is placed horizontally and fixed to a roof of a vehicle and is substantially used to carry large articles, such as a luggage, bicycles, ski boards, and so on. Most vehicle roof racks in the art have fixed length, and therefore, most brands develop vehicle roof racks that are used for specific types of vehicle roofs, such that practicability of the vehicle roof racks in the art may be limited.

SUMMARY OF THE DISCLOSURE

The present disclosure provides a vehicle roof rack including: a first cross rod and a second cross rod. The first cross rod includes a first connection end and a first mounting end. The second cross rod includes a second connection end and a second mounting end. The first connection end includes a plurality of first connection portions, the second connection end is selectively connected to any one of the plurality of first connection portions to adjust a distance between the first connection end and the second connection end.

REFERENCE NUMERALS IN THE DRAWINGS

Figure 1:
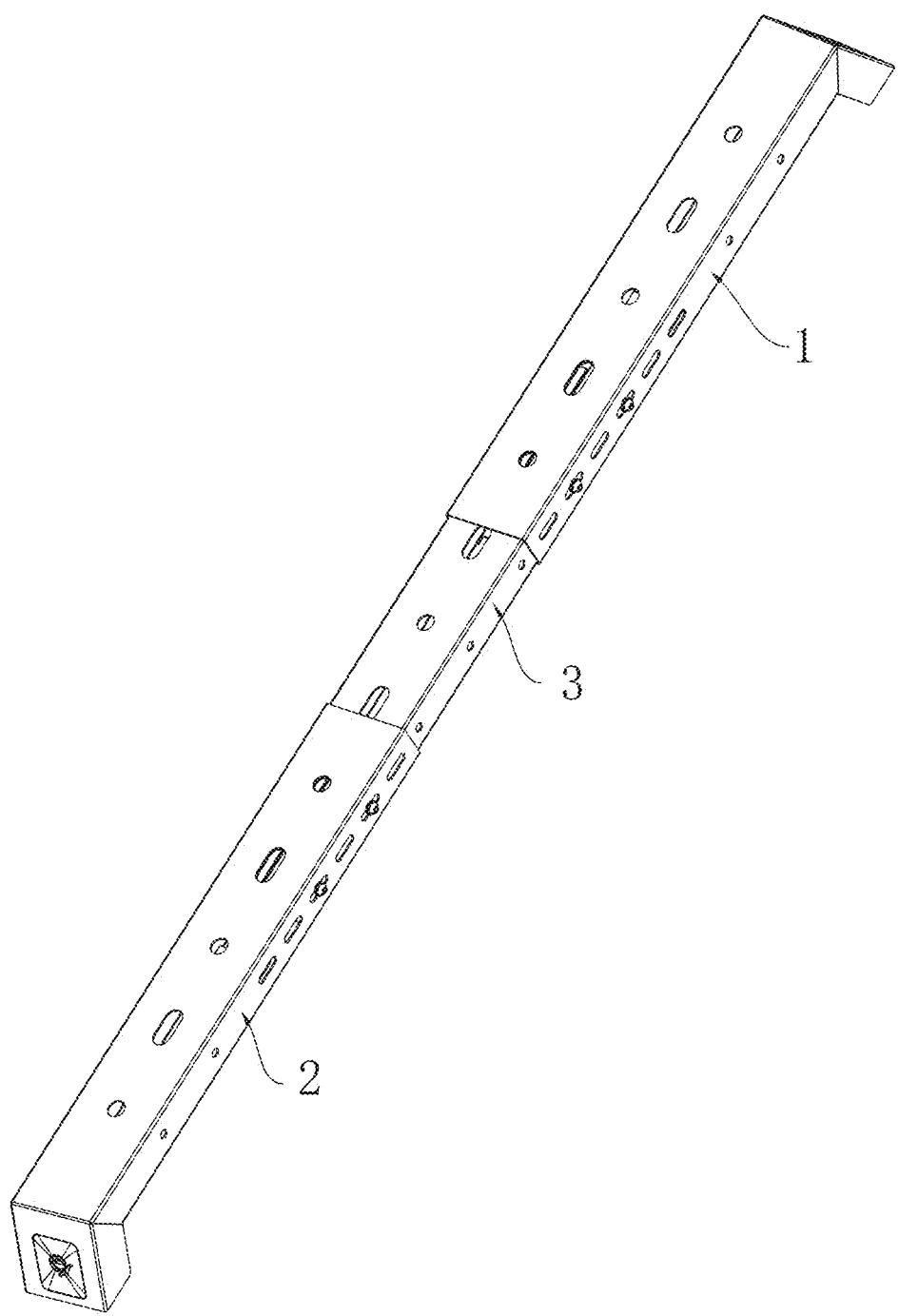
FIG. 1 is a structural schematic view I of a vehicle roof rack according to an embodiment of the present disclosure.
Figure 2:
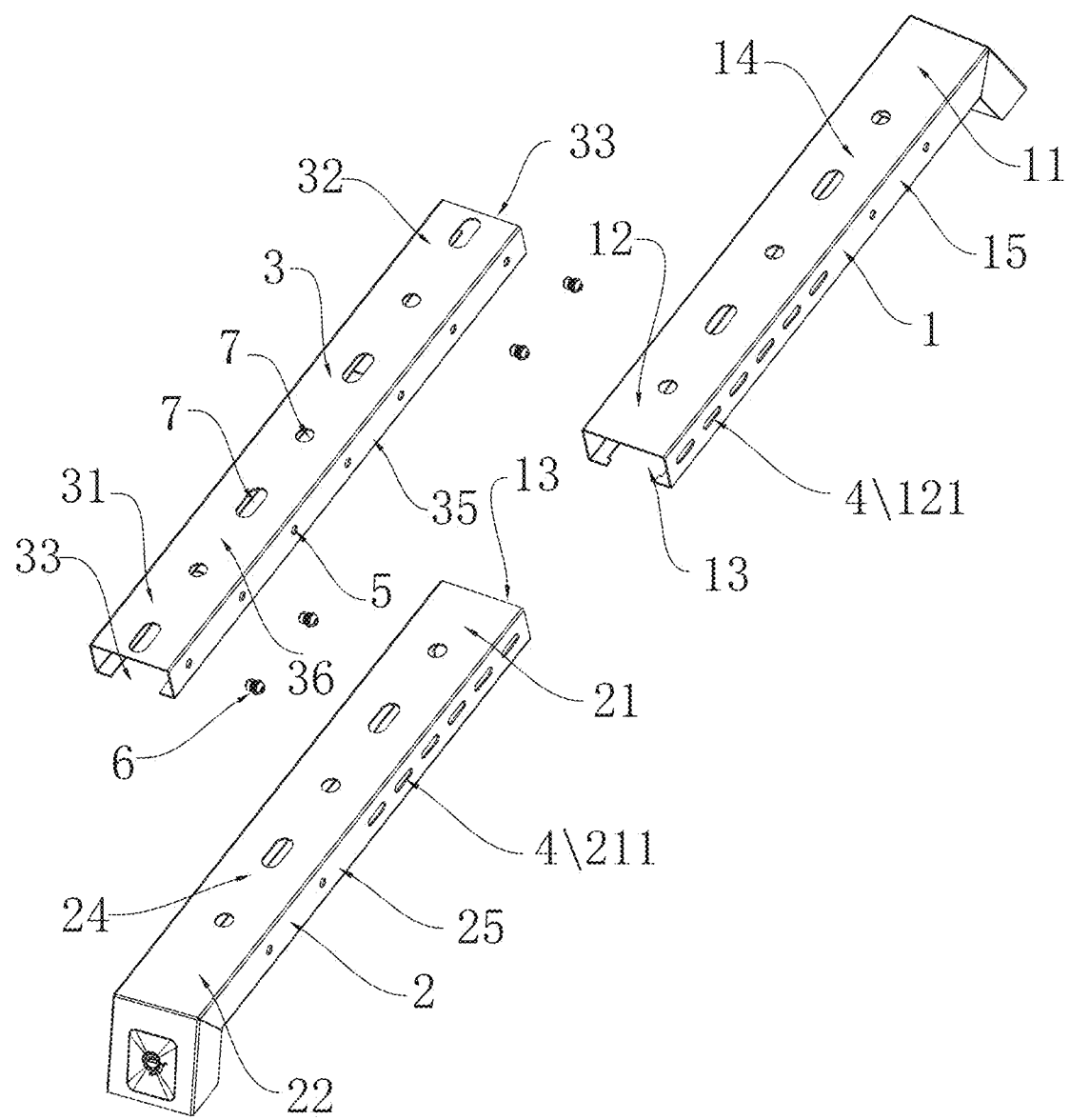
FIG. 2 is an exploded view of the vehicle roof rack according to an embodiment of the present disclosure.

1—first cross rod; 2—second cross rod; 3—connection rod; 4—first opening; 5—second opening; 6—fastener; 7—mounting hole; 8—two outer sides; 9—mounting base; 10—bracket bottom; 101—flat support; 11—first mounting end; 12—first connection end; 13—second cavity; 14—top surface of first cross rod; 15—right side surface of first cross rod; 16—left side surface of first cross rod; 17—bottom surface of first cross rod; 21—second connection end; 22—second mounting end; 24—top surface of second cross rod; 25—right side surface of second cross rod; 26—left side surface of second cross rod; 27—bottom surface of second cross rod; 31—second end; 32—first end; 33—first cavity; 35—right side surface of connection rod; 36—top surface of connection rod; 37—left side surface of connection rod; 38—bottom surface of connection rod; 102—connection beam; 121—first connection portion; 211—second connection portion.

DETAILED DESCRIPTION

In order to make purposes, features and advantages of the present disclosure more obvious and understandable, embodiments of the present disclosure will be described in detail by referring to the accompanying drawings in the following.

To be noted that the terms "first", "second", and so on, in the specification, claims and the accompanying drawings of the present disclosure are used to distinguish objects and shall not be interpreted as describing a particular order or sequence. To be understood that data used in such a way may be interchangeable, such that the embodiments of the present disclosure described herein can be implemented in an order other than those illustrated or described herein.

In the description of the present disclosure, it is to be noted that the terms "arranged", "mounted", "connected", "coupled" shall be understood in a broad sense, unless otherwise expressly specified and qualified. For example, connection may be fixed connection, detachable connection, configured as a one-piece structure; or mechanical connection; or direct connection, indirect connection through an intermediate medium; or connection within two elements. Any ordinary skilled person in the art shall understand the specific meaning of the above terms in the context of the present disclosure case by case.

In the description of the present disclosure, "embodiment", "one embodiment", "an embodiment", and so on, means that specific features, structures, materials, or properties described in an embodiment or implementation are included in at least one embodiment or implementation of the present disclosure. In the present specification, schematic expressions of the above terms do not necessarily refer to a same embodiment or implementation. Moreover, the described specific features, structures, materials, or properties may be combined in any one or more of the embodiments or implementations in a suitable manner.

The present disclosure will be described in detail below by referring to the accompanying drawings.

In order to solve the above technical problems, as shown in FIGS. 1-11, embodiments of the present disclosure provide a vehicle roof rack, including following components.

An adjustment direction refers to a length direction of the vehicle roof.

A first cross rod 1 is arranged and includes a first connection end 12 and a first mounting end 11.

A second cross rod 2 is arranged and includes a second connection end 21 and a second mounting end 22. The first connection end 12 includes a plurality of first connection portions 121.

The second connection end 21 is selectively connected to any one of the plurality of first connection portions 121, such that a distance between the first connection end 12 and the second connection end 21 is adjusted.

To be noted that, the first mounting end 11 and the second mounting end 22 are mounted to the vehicle roof. The first connection end 12 includes the plurality of first connection portions 121. The first connection portions 121 are arranged along a length direction of the first connection end 12. The second connection end 21 is selectively connected to any one of the plurality of first connection portions 121. In this way, a relative position between the first connection end 12 and the second connection end 21 is adjusted, and therefore, a length of the vehicle roof rack is adjusted, and the vehicle roof rack may be applicable to various vehicles having various types of roofs, practicability of the vehicle roof rack is improved.

In an embodiment, as shown in FIGS. 1-11, the vehicle roof rack further includes a connection rod 3. The second connection end 21 is selectively connected, via the connection rod 3, to any one of the plurality of first connection portions 121.

To be noted that, the first connection end 12 and the second connection end 21 may be directly connected to each other. Alternatively, the second connection end 21 and the first connection end 12 may be connected to each other via the connection rod 3. In this case, the first connection end 12 is arranged with the plurality of first connection portions 121, and the connection rod 3 is selectively connected to any one of the plurality of first connection portions 121. In this way, the distance between the first connection end 12 and the second connection end 21 is adjusted, such that the length of the vehicle roof rack is adjusted.

In an embodiment, as shown in FIGS. 1-11, the connection rod 3 includes a first end 32 and a second end 31. The first end 32 is selectively connected to any one of the plurality of first connection portions. The second connection end 21 includes a plurality of second connection portions. The second end 31 is selectively connected to any one of the plurality of second connection portions.

To be noted that, in an embodiment, the first end 32 of the connection rod 3 is selectively connected to any one of the plurality of first connection portions 121, and the second end 31 of the connection rod 3 is selectively connected to any one of the plurality of second connection portions 211. The plurality of first connection portions 121 are arranged along the length direction of the first cross rod 1. The plurality of second connection portions 211 are arranged along the length direction of the second cross rod 2. In this way, both the first end 32 and the second end 21 can adjust the distance between the first connection end 121 and the second connection end 211, a range in which the length of the vehicle roof rack can be adjusted is increased.

In an embodiment, as shown in FIGS. 4-6 and FIGS. 10-11, each of the first end 32 and the second end 31 defines a first cavity 33 therein. The first connection end 12 is slidably inserted in the first cavity 33 defined in the first end 32, and the second connection end 21 is slidably inserted in the first cavity 33 defined in the second end 31.

To be noted that, in an embodiment, each of the first end 32 and the second end 31 defines the first cavity 33. The first cavity 33 extends along the adjustment direction. Each of the first end 32 and the second end 31 has an opening, enabling each of the first connection end 12 and the second connection end 21 to be slidably inserted in the respective first cavity 33. In some embodiments, the connection rod 3 is hollow, such that a longer slide space is provided along the adjustment direction. In this way, an adjustment length of the vehicle roof rack is increased. The adjustment is achieved by sliding insertion, such that when objects are placed on top of the first cross rod 1, the second cross rod 2, and the connection rod 3, the vehicle roof rack is more stable and is less likely to be shifted.

In an embodiment, as shown in FIGS. 1-3 and FIGS. 7-9, each of the first connection end 12 and the second connection end 21 defines a second cavity 13. The first end 32 is slidably inserted in the second cavity 13 defined in the first connection end 12, and the second end 31 is slidably inserted in the second cavity 13 defined in the second connection end 21.

To be noted that, in another embodiment, each of the first connection end 12 and the second connection end 21 defines the second cavity 13. Similarly, the second cavity 13 is extending along the adjustment direction, and each of the first connection and the second connection end 21 defines an opening, enabling each of the first end 32 and the second end 31 to be slidably inserted in the respective second cavity 13. In some embodiments, the first cross rod 1 and the second cross rod 2 are both hollow, such that a longer sliding space is provided along the adjustment direction, further increasing the adjustment length of the vehicle roof rack.

In an embodiment, as shown in FIGS. 1-6, a top surface 36 of the connection bar 3, a top surface 14 of the first cross rod 1, and a top surface 24 of the second cross rod 2 are all flat surfaces.

To be noted that, in an embodiment, the top surface 36 of the connection bar 3, the top surface 14 of the first cross rod 1, and the top surface 24 of the second cross rod 2 are all flat surfaces. The flat surfaces are arranged to maximize a contact area between a large object and the vehicle roof rack, improving a carrying capacity of the vehicle roof rack. In addition, the flat surfaces allows the object to be placed more stably, and the object may not be fallen off easily.

In an embodiment, as shown in FIGS. 1-6, each of the connection rod 3, the first cross rod 1 and the second cross rod 2 is a quadrangular rod.

To be noted that, each of the connection rod 3, the first cross rod 1 and the second cross rod 2 is quadrangular. In some embodiments, each of the connection rod 3, the first cross rod 1 and the second cross rod 2 may be a quadrangular rod having a square or rectangular shaped cross section. The quadrangular rod having the square or rectangular shaped cross section allows each peripheral side of each of the connection rod 3, the first cross rod 1 and the second cross rod 2 is flat. In this way, when the vehicle roof rack is used as a basis for carrying and transportation, a corresponding vehicle roof box, a vehicle roof basket and a vehicle roof bracket may be mounted on the vehicle roof rack easily, and the flat surfaces may facilitate load bearing and prevent objects from sliding off therefrom.

In an embodiment, as shown in FIGS. 7-11, each of the top surface 36 of the connection rod 3, the top surface 14 of the first cross rod 1 and the top surface 24 of the second cross rod 2 is a curved surface.

To be noted that, in an embodiment, each of the top surface 36 of the connection rod 3, the top surface 14 of the first cross rod 1 and the top surface 24 of the second cross rod 2 is the curved surface. The curved surface may be arranged to minimize wind resistance when the vehicle is moving, such that an influence in a speed and energy consumption of the vehicle, caused by mounting the vehicle roof rack, is reduced.

In an embodiment, as shown in FIGS. 7-11, each of the connection rod 3, the first cross rod 1 and the second cross rod 2 is a flat cylindrical rod.

To be noted that, in some embodiments, each of the connection rod 3, the first cross rod 1 and the second cross rod 2 is the flat cylindrical rod. The flat cylindrical rod allows a curvature of the top surface of the vehicle roof rack to be flatter, such that the contact area between the object and the vehicle roof rack may be increased, the load-bearing capability and the anti-slipping effect may be achieved.

In an embodiment, as shown in FIGS. 1-11, the vehicle roof rack further includes a plurality of fasteners 6. Each of the plurality of first connection portions 121 and each of the plurality of second connection portions 211 is a first opening 4. The plurality of the first openings 4 are arranged along the length direction of the first connection end 12 and the length direction of the second connection end 21. Each of the first end 32 and the second end 31 of the connection rod 3 defines at least one second opening 5. Each fastener 6 selectively extends through one of the plurality of first openings 4 and one of the at least one second opening 5.

To be noted that, each of the plurality of first connection portions 121 and each of the plurality of second connection portions 211 is the first opening 4. A plurality of first openings 4 are arranged along the length direction on the first connection end 12, and a plurality of first openings 4 are arranged along the length direction on the second connection end 21. Each of the first end 32 and the second end 31 of the connection rod 3 defines at least one second opening 5. The first end 32 of the connection bar 3 and the first cross rod 1 are connected to each other in a sleeved manner, and the second end 31 of the connection bar 3 and the second cross rod 2 are connected to each other in a sleeved manner. When in use, a position of the second opening 5 is selectively aligned with a corresponding one of the plurality of first opening 4, and the fastener 6 is used to extend through the aligned the second opening 5 and the first opening 4 to fasten the connection bar 3 with the cross rod, such that the length of the vehicle roof rack is adjusted. The number of the at least one second opening 5 at the first end 32 may be one, and the number of the at least one second opening 5 at the second end 31 may be one. The one second opening 5 is selectively aligned with the respective one of the plurality of first openings 4, such that the length of the vehicle roof rack is adjusted. The number of the at least one second opening 5 at the first end 32 may be more than one, and the number of the at least one second opening 5 at the second end 31 may be more than one. The more than one second openings 5 may be fastened by the plurality of fasteners 6 at the same time, such that stability of the vehicle roof rack is improved. The fastener 6 may be a bolt and a fastener in other types.

In an embodiment, as shown in FIGS. 1-11, the connection rod 3 defines a plurality of the second openings 5, and the plurality of second openings 5 are arranged along the length direction of the connection rod 3.

To be noted that, in some embodiments, the connection rod 3 may be hollow, the connection rod 3 may define the plurality of second openings 5. The plurality of the second openings 5 are arranged along the length direction of the connection rod 3. In this way, when adjusting the length, the plurality of second openings 5 enable the fasteners 6 to selectively extend through the plurality of second openings 5 and the corresponding first openings 4 for fastening. By arranging the plurality of second openings 5, the range in which the length of the vehicle roof rack can be adjusted is further increased.

Figure 3:
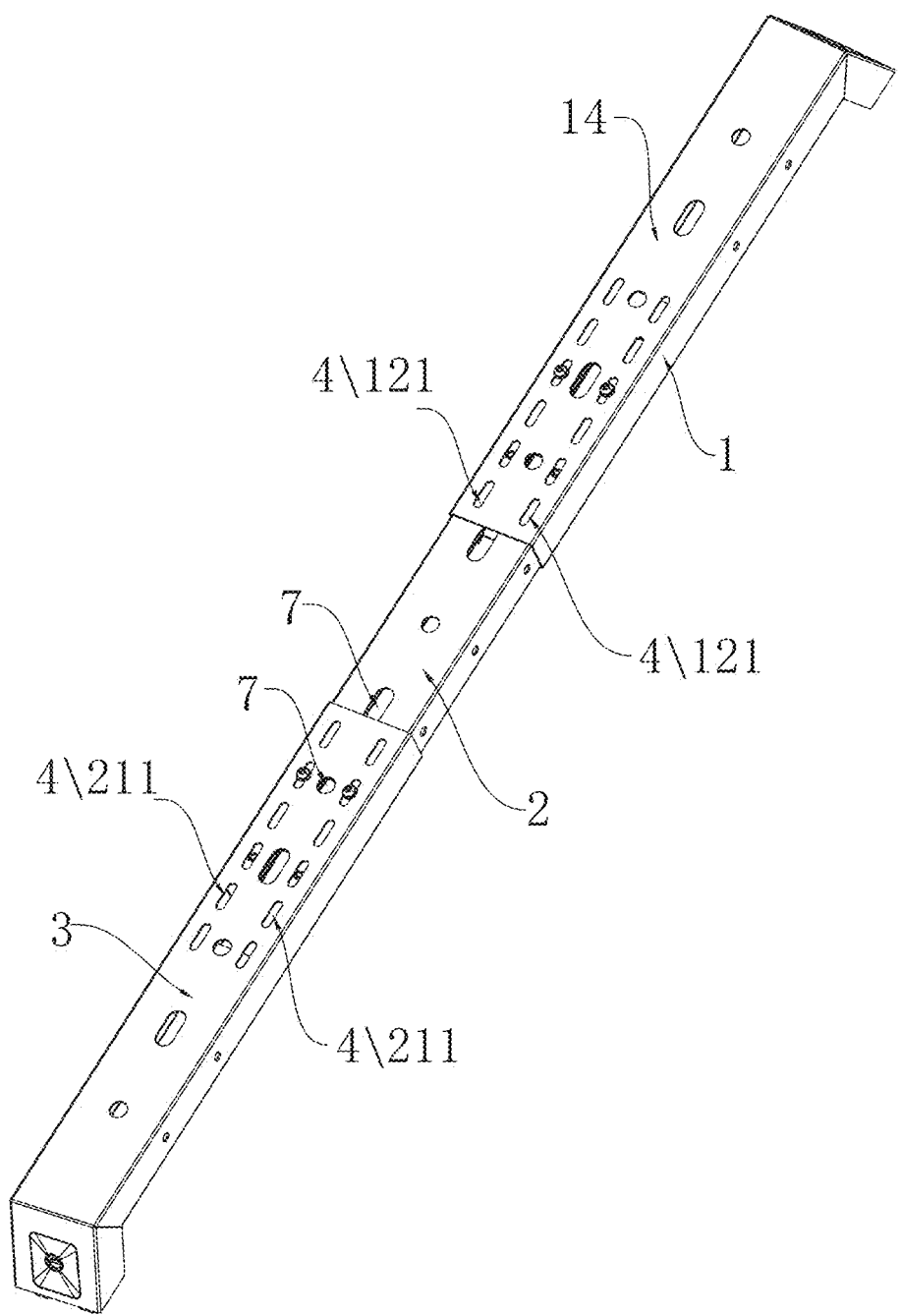
FIG. 3 is a structural schematic view II of the vehicle roof rack according to an embodiment of the present disclosure.
Figure 4:
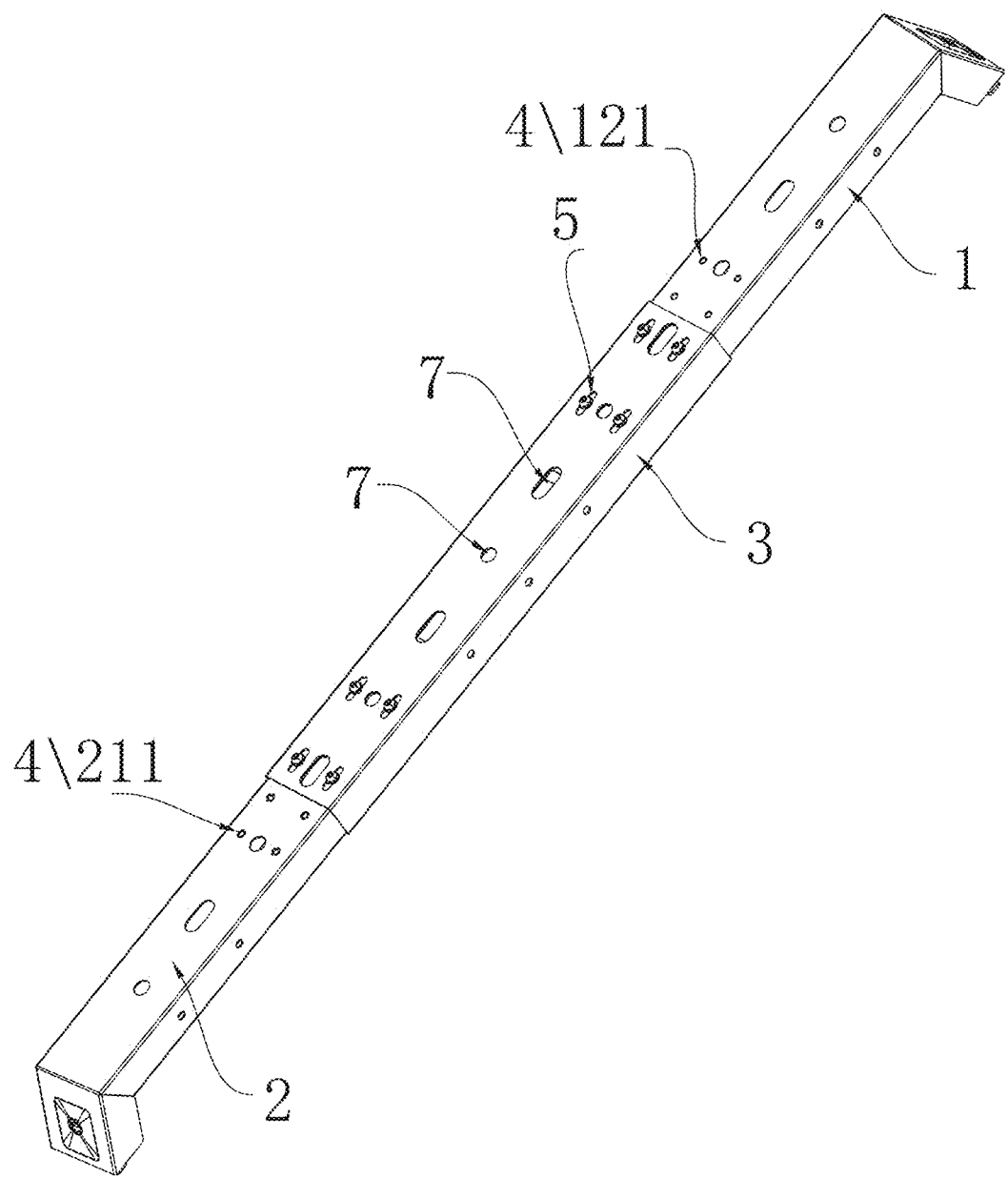
FIG. 4 is a structural schematic view III of the vehicle roof rack according to an embodiment of the present disclosure.
Figure 5:
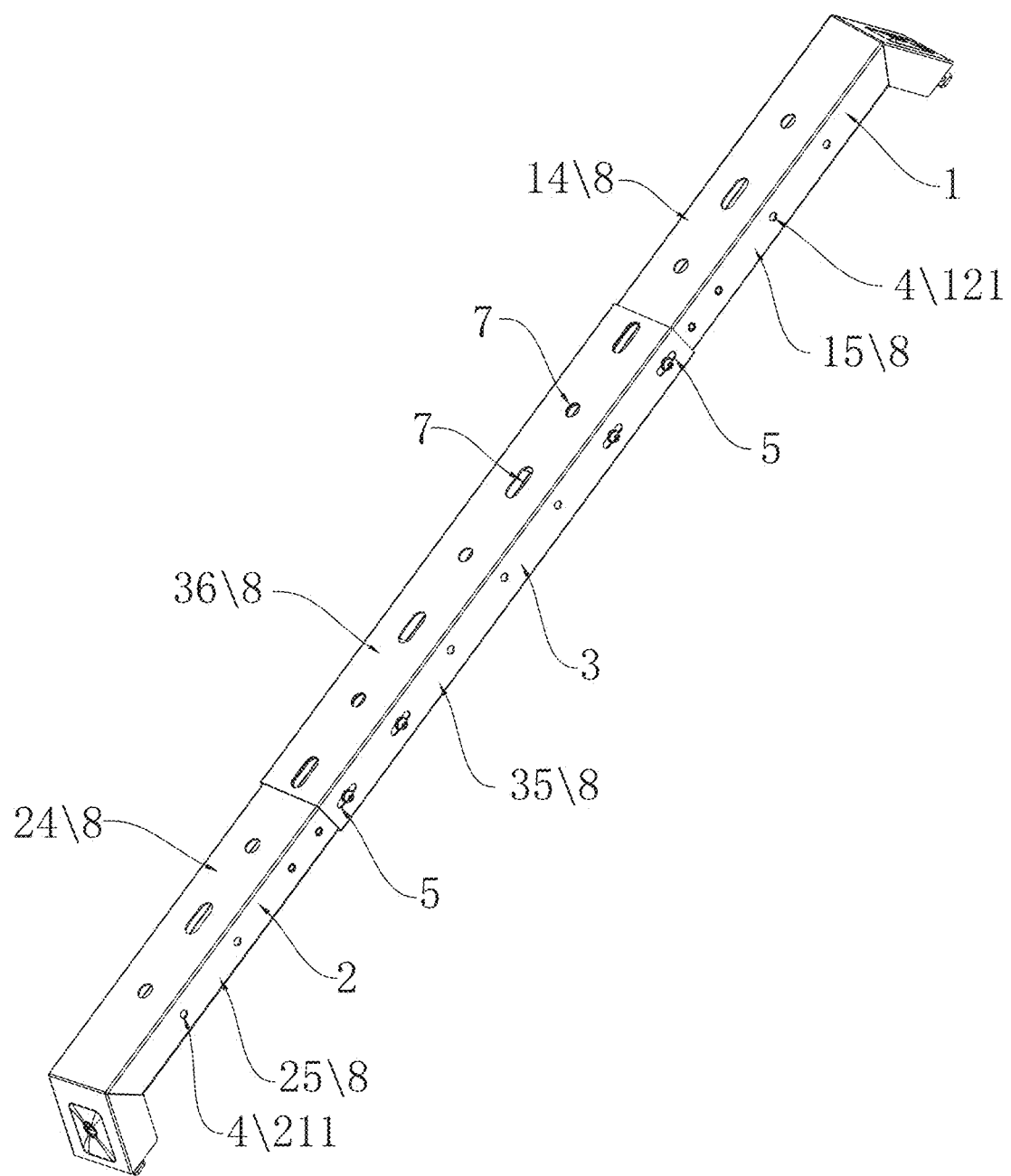
FIG. 5 is a structural schematic view IV of the vehicle roof rack according to an embodiment of the present disclosure.

In an embodiment, as shown in FIGS. 3 and 4, the plurality of first openings 4 are arranged in two rows. The two rows of the first openings 4 are arranged on the top surface of the first cross rod 1 and on the top surface of the second cross rod 2.

To be noted that, in an embodiment, the plurality of the first openings 4 are arranged in two rows on the top surface 14 of the first cross rod 1 and on the top surface 24 of the second cross rod 2. Therefore, at least two second openings 5 are defined and are arranged in two rows on the connection rod 3. Arranging the first openings 4 and the second openings 5 in the two rows allows two rows of fasteners 6 to be used to extend through the cross rod and the connection rod, such that connection between the cross rod and the connection rod is more secured, and the first cross rod 1, the second cross rod 2 and the connection rod 3 are prevented from shifting due to carrying weights.

In an embodiment, as shown in FIGS. 1-2 and FIGS. 5-11, the plurality of first openings 4 are located on two symmetrical outer sides 8 of the first cross rod 1, and the plurality of first openings 4 are located on two symmetrical outer sides 8 of the second cross rod 2.

To be noted that, in some embodiments, the plurality of first openings 4 are arranged in the two rows. One row of the two rows of the first openings 4 are located on the top surface 14 of the first cross rod 1 and on the top surface 24 of the second cross rod 2, and the other one row of the two rows of the first openings 4 are located on a bottom surface 17 of the first cross rod 1 and on a bottom surface 27 of the second cross rod 2. Similarly, in another embodiment, one row of the two rows of the first openings 4 are located on a left surface 16 of the first cross rod 1 and on a left surface 26 of the second cross rod 2, and the other one row of the two rows of the first openings 4 are located on a right surface 15 of the first cross rod 1 and on a right surface 25 of the second cross rod 2. To be understood that, in this case, each of the first end 31 and on the second end 32 defines at least two second openings 5, and the at least two second openings 5 are located on a same side as respective first openings 4, enabling the fasteners 6 to extend through the corresponding second openings 5 and the first openings 4 for fastening. In particular, when the first openings 4 are located on the left side and the right side of the first cross rod 1 and on the left side and the right side of the second cross rod 2, the top surface of the vehicle roof rack may be prevented from being uneven due to penetration of the fasteners 6, such that objects on the vehicle roof rack may not be affected, improving the usage experience.

In an embodiment, as shown in FIGS. 1-11, each of the connection rod 3, the first cross rod 1 and the second cross rod 2 is hollow and has a thin shell.

To be noted that, in some embodiments, each of the connection rod 3, the first cross rod 1 and the second cross rod 2 is hollow and has the thin shell. On the one hand, the rod being hollow and having the thin shell allows an extension length of the first cavity 33 and the second cavity 13 to be maximized, the adjustment length of the vehicle roof rack is increased. On the other hand, the rod being hollow and having the thin shell allows a weight of the vehicle roof rack to be reduced, an influence on a weight of the entire vehicle, caused by a weight of the vehicle roof rack, is reduced, such that the energy consumption of the vehicle is reduced.

Figure 6:
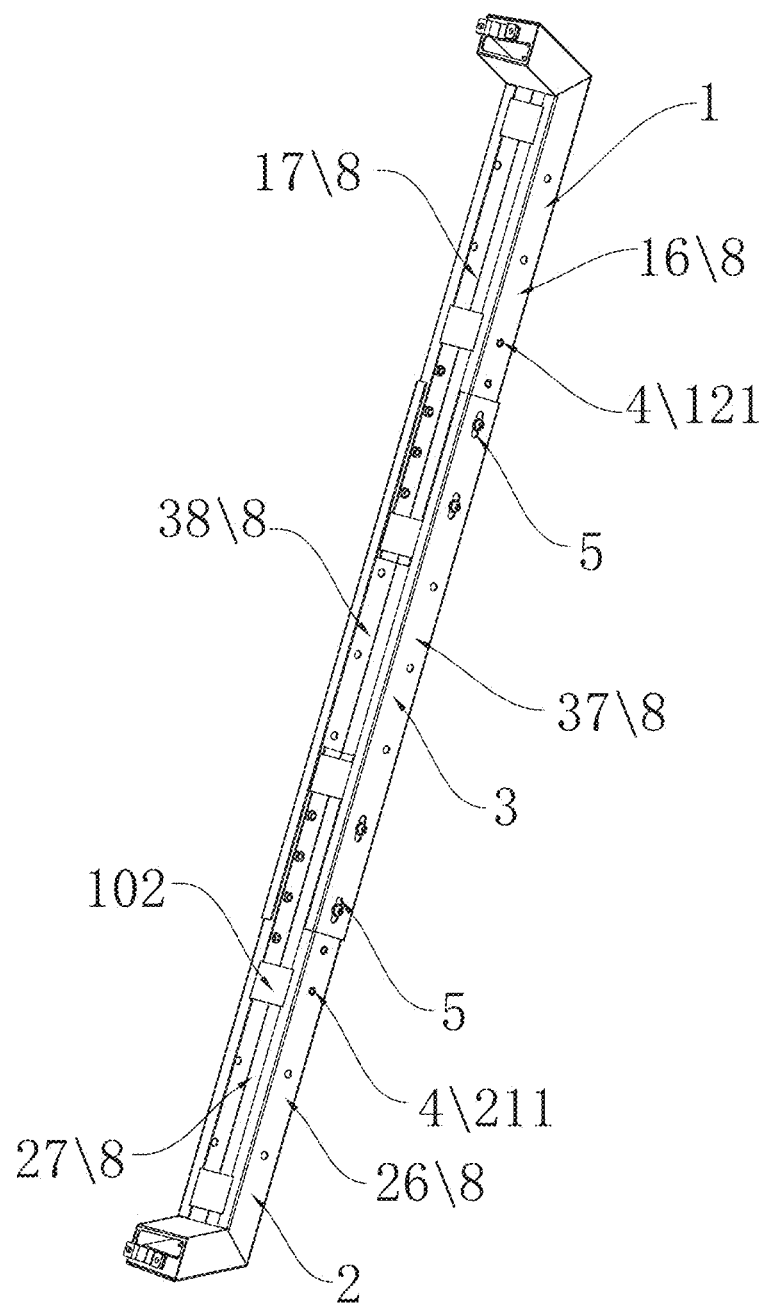
FIG. 6 is a structural schematic view V of the vehicle roof rack according to an embodiment of the present disclosure.

In an embodiment, as shown in FIG. 6, each of a bottom surface 38 of the connection rod 3, a bottom surface 17 of the first cross rod 1 and a bottom surface 27 of the second cross rod 2 has an opening.

To be noted that, in some embodiments, each of the bottom surface 38 of the connection rod 3, the bottom surface 17 of the first cross rod 1 and the bottom surface 27 of the second cross rod 2 has the opening. In this way, the weight of the vehicle roof rack is further reduced. The vehicle roof rack further includes a plurality of connection beams 102. The plurality of connection beams are spaced apart from each other, and each of the bottom surface 38 of the connection rod 3, the bottom surface 17 of the first cross rod 1 and the bottom surface 27 of the second cross rod 2 is arranged with at least one of the plurality of connection beams 102. In this way, the connection rod 3, the first cross rod 1 and the second cross rod 2 are reinforced and are prevented from being deformed due to load bearing.

In an embodiment, as shown in FIGS. 1-5, each of the connection rod 3, the first connection end 12 and the second connection end 21 further defines a plurality of mounting holes 7 to mount accessories.

To be noted that the plurality of mounting holes 7 are arranged in the adjustment direction. Each mounting hole 7 may be an elongated round hole or a round hole. In some embodiments, for the plurality of mounting holes 7, the elongated round hole and the round hole are alternately arranged. When in use, the vehicle roof box, the vehicle roof basket, and the vehicle roof bracket may be mounted to the vehicle roof rack by taking a connection member, such as a screw, to extend through a respective one of the plurality of mounting holes 7.

Figure 7:
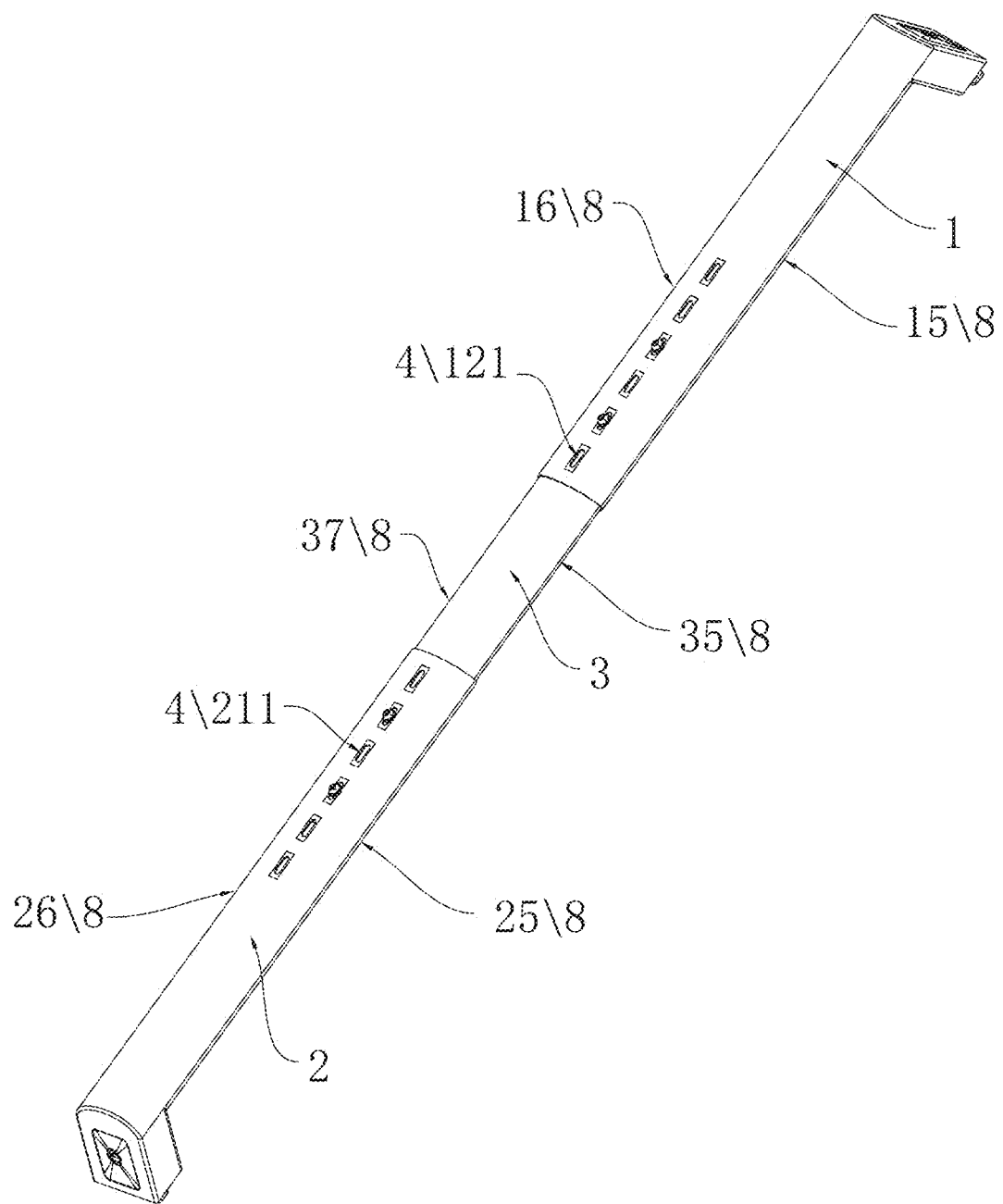
FIG. 7 is a structural schematic view VI of the vehicle roof rack according to an embodiment of the present disclosure.
Figure 8:
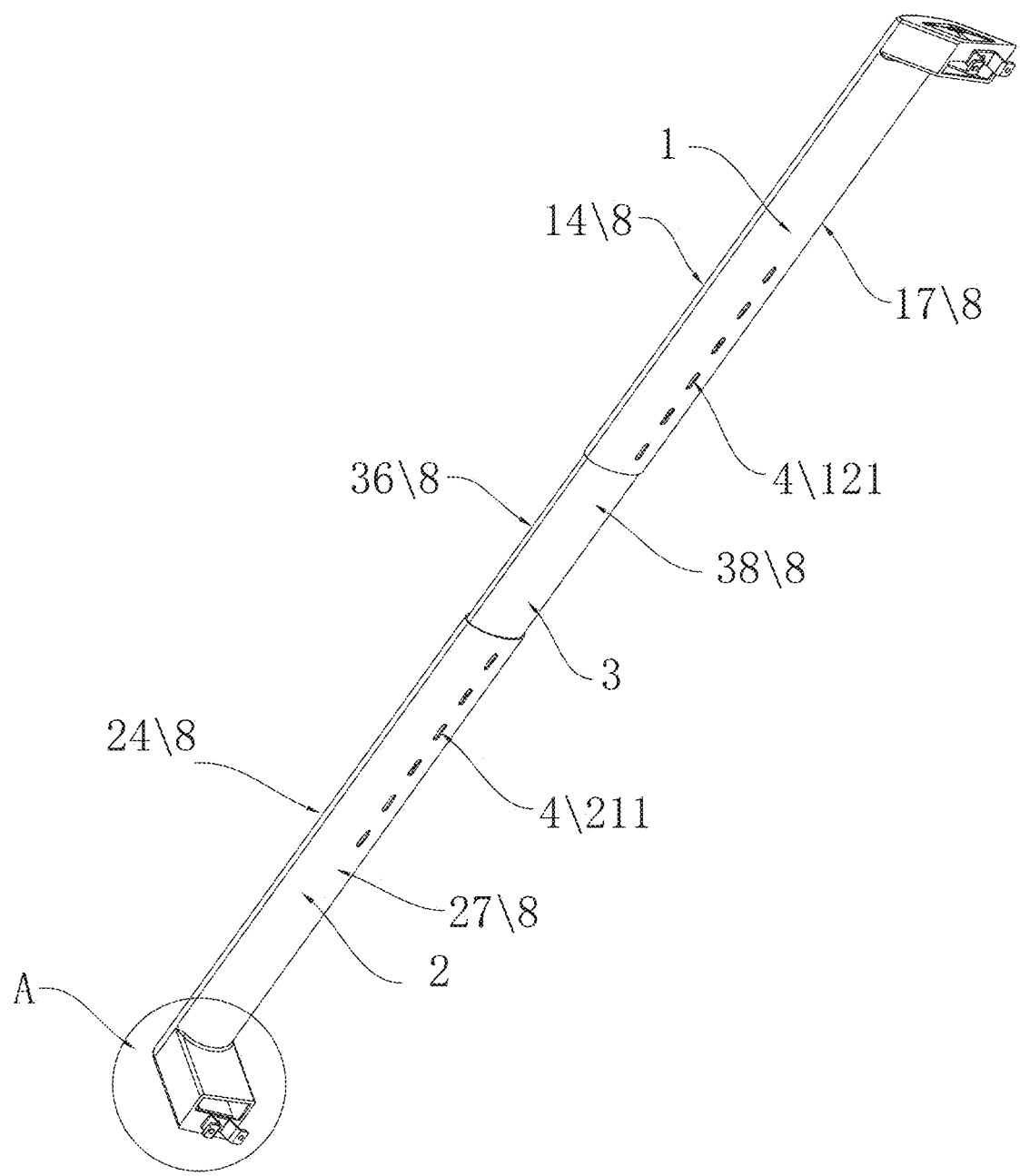
FIG. 8 is a structural schematic view VII of the vehicle roof rack according to an embodiment of the present disclosure.
Figure 9:
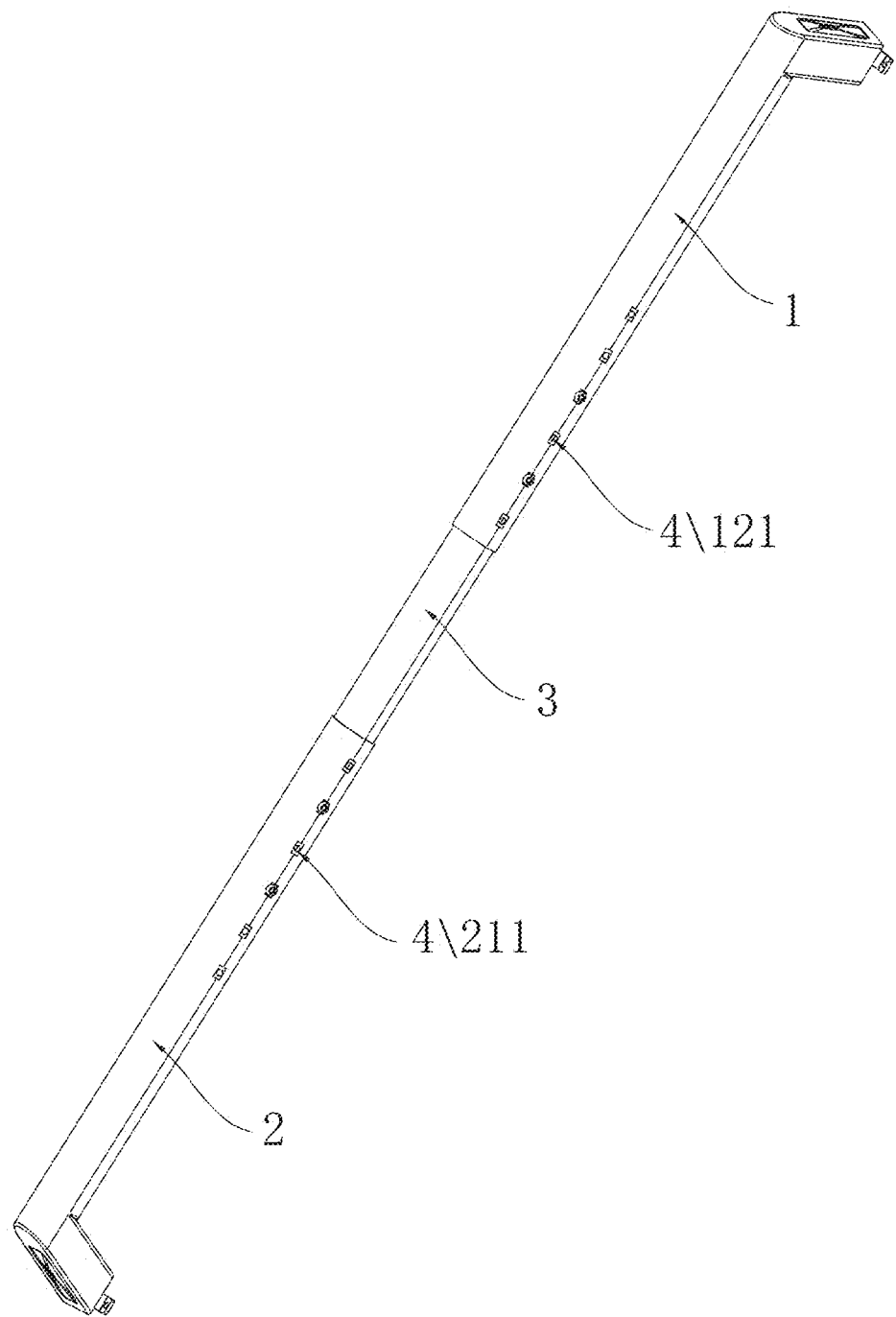
FIG. 9 is a structural schematic view VIII of the vehicle roof rack according to an embodiment of the present disclosure.
Figure 10:
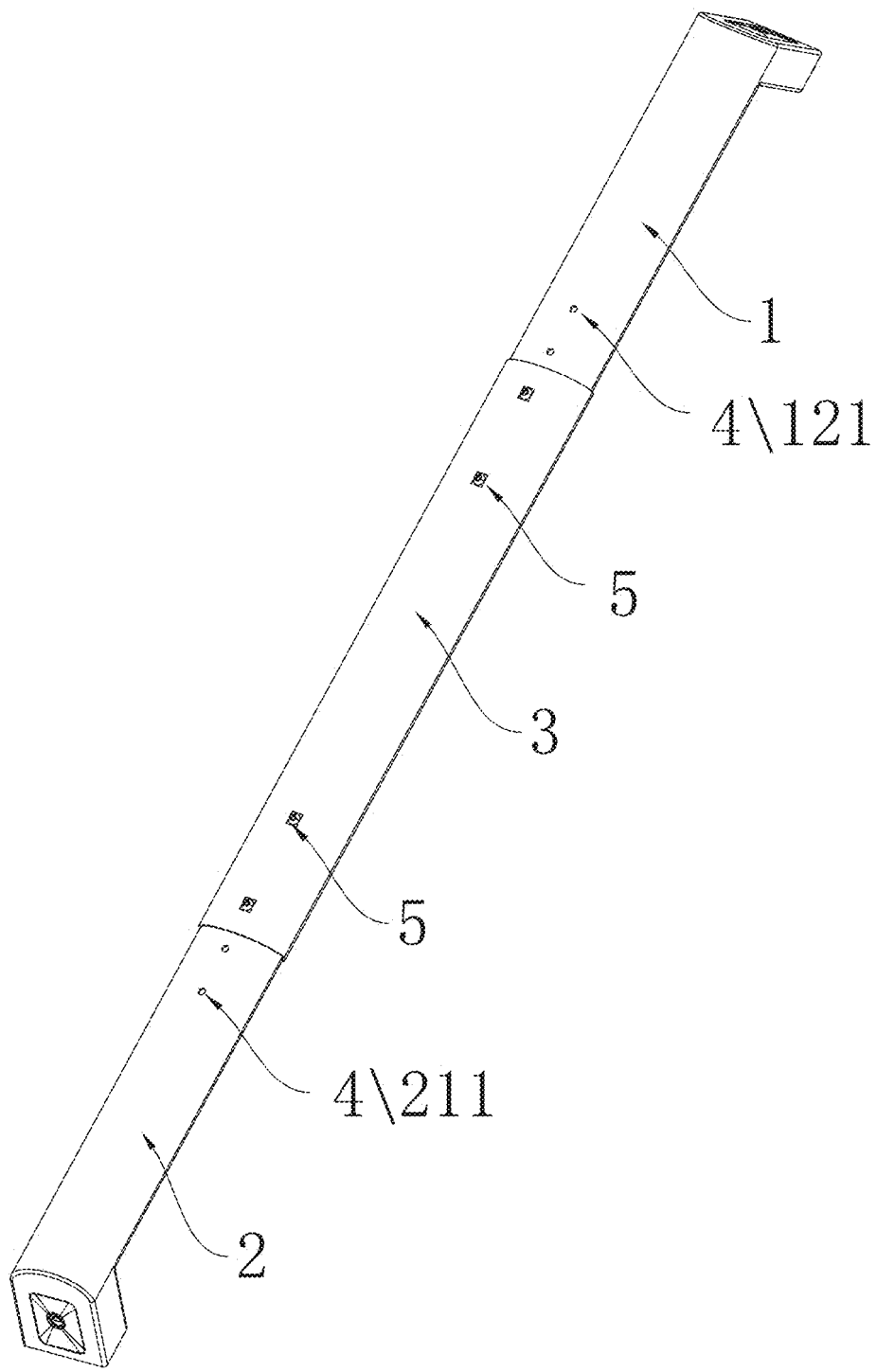
FIG. 10 is a structural schematic view IX of the vehicle roof rack according to an embodiment of the present disclosure.
Figure 11:
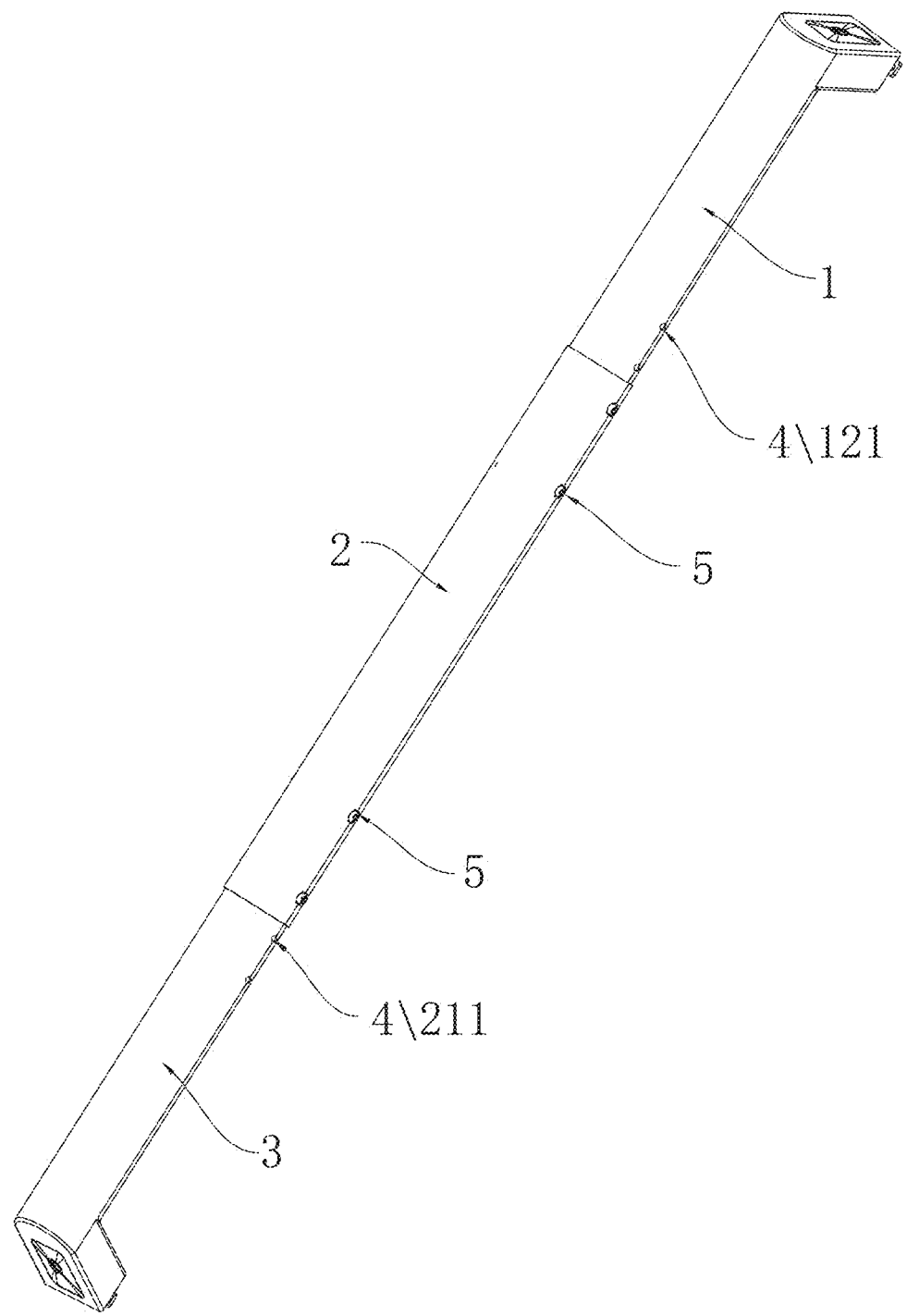
FIG. 11 is a structural schematic view X of the vehicle roof rack according to an embodiment of the present disclosure.
Figure 12:
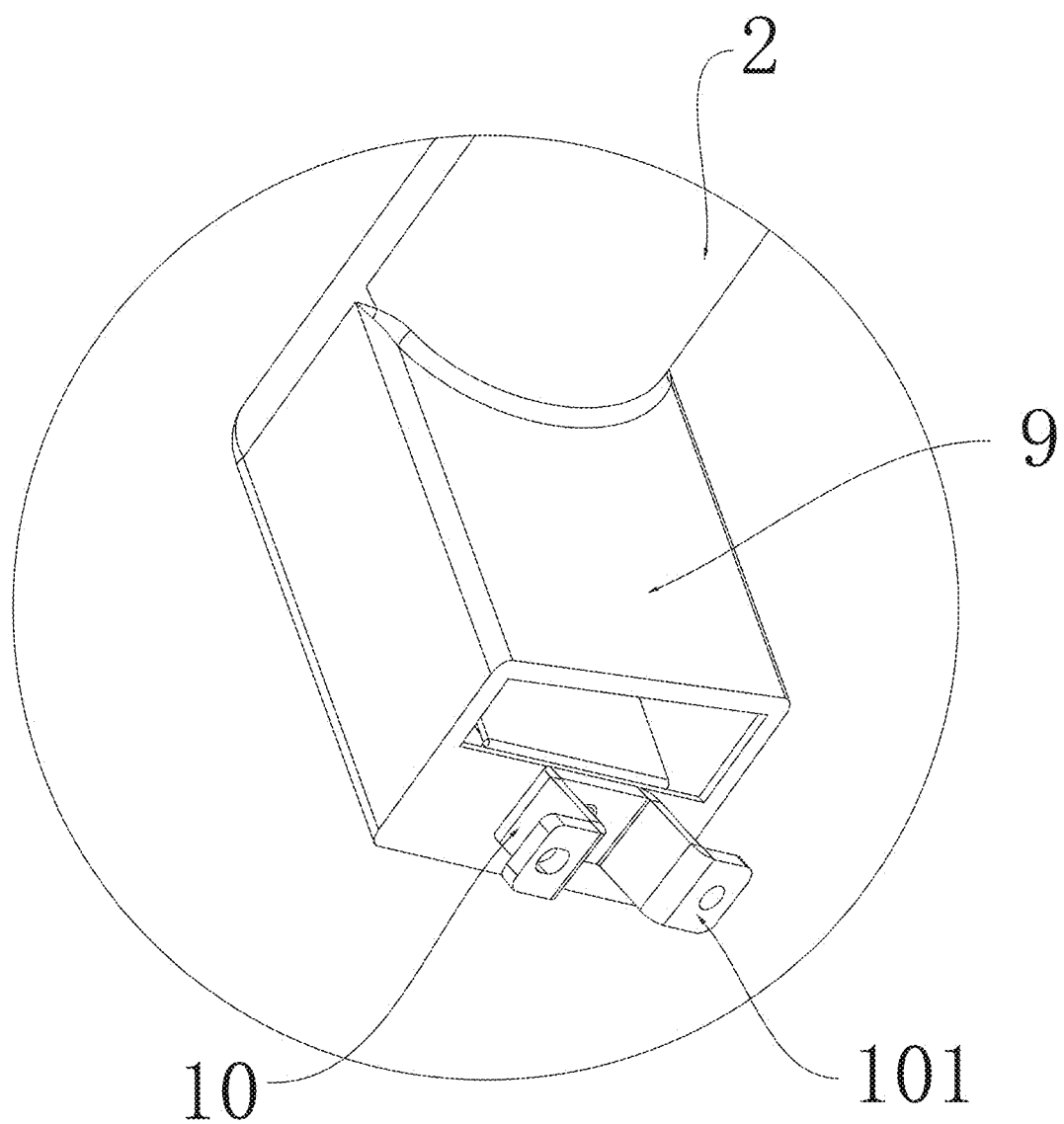
FIG. 12 is a structural schematic view XI of the vehicle roof rack according to an embodiment of the present disclosure.

In an embodiment, as shown in FIG. 7 and FIG. 12, each of the first mounting end 11 and the second mounting end 22 is arranged with a mounting base 9 extending towards the vehicle roof. The mounting base 9 is arranged with a bracket bottom 10, and the bracket bottom 10 is configured to be mounted to the vehicle roof.

To be noted that each mounting base 9 extends towards the vehicle roof, and the mounting base 9 is arranged with the bracket bottom 10. An end of the bracket bottom 10 near the vehicle roof is bent to form two flat supports 101 that are symmetrical to each other. The flat supports 101 are configured to be mounted on the vehicle roof, such that the vehicle roof rack is mounted.

To be noted that the above technical features may be further combined with each other to form various embodiments that are not listed in the above, and the various embodiments are considered to be within the scope of the present disclosure. Any ordinary skilled person in the art may perform improvement or transformation based on the above description, and the improvement or transformation shall fall within the scope of the appended claims of the present disclosure.

What is claimed is:

1. A vehicle roof rack, comprising:
a first cross rod, comprising a first connection end and a first mounting end;
a connection rod; and
a second cross rod, comprising a second connection end and a second mounting end; wherein the first connection end comprises a plurality of first connection portions, the second connection end is selectively connected, via the connection rod, to any one of the plurality of first connection portions to adjust a distance between the first connection end and the second connection end;
wherein the connection rod comprises a first end and a second end; the first end is selectively connected to any one of the plurality of first connection portions; the second connection end comprises a plurality of second connection portions: the second end is selectively connected to any one of the plurality of second connection portions.

2. The vehicle roof rack according to claim 1, wherein, each of the first end and the second end defines a first cavity; the first connection end is slidably inserted in the first cavity defined in the first end, and the second connection end is slidably inserted in the first cavity defined in the second end.

3. The vehicle roof rack according to claim 1, wherein, each of the first connection end and the second connection end defines a second cavity; the first end is slidably inserted in the second cavity defined in the first connection end, and the second end is slidably inserted in the second cavity defined in the second connection end.

4. The vehicle roof rack according to claim 1, wherein, each of a top surface of the connection bar, a top surface of the first cross rod, and a top surface of the second cross rod is a flat surface.

5. The vehicle roof rack according to claim 4, wherein, each of the connection rod, the first cross rod and the second cross rod is a quadrangular rod.

6. The vehicle roof rack according to claim 1, wherein, each of a top surface of the connection bar, a top surface of the first cross rod, and a top surface of the second cross rod is a curved surface.

7. The vehicle roof rack according to claim 6, wherein, each of the connection rod, the first cross rod and the second cross rod is a flat cylindrical rod.

8. The vehicle roof rack according to claim 1, wherein, further comprising a plurality of fasteners; wherein,
the plurality of first connection portions and the plurality of second connection portions are a plurality of first openings; the plurality of the first openings are arranged along a length direction of the first connection end and a length direction of the second connection end; each of the first end and the second end of the connection rod defines at least one second opening; each of the plurality of fasteners selectively extends through one of the plurality of first openings and one of the at least one second opening.

9. The vehicle roof rack according to claim 8, wherein, the number of the at least one second opening is more than one, and the more than one second openings are arranged along the length direction of the connection rod.

10. The vehicle roof rack according to claim 8, wherein, the plurality of first openings are arranged in two rows; the two rows of the first openings are arranged on a top surface of the first cross rod and on a top surface of the second cross rod.

11. The vehicle roof rack according to claim 8, wherein, the plurality of first openings are located on two symmetrical outer sides of the first cross rod and on two symmetrical outer sides of the second cross rod.

12. The vehicle roof rack according to claim 1, wherein, each of the connection rod, the first cross rod and the second cross rod is hollow and has a thin shell.

13. The vehicle roof rack according to claim 12, wherein, each of a bottom surface of the connection rod, a bottom surface of the first cross rod and a bottom surface of the second cross rod has an opening.

14. The vehicle roof rack according to claim 13, further comprising a plurality of connection beams; wherein,
the plurality of connection beams are spaced apart from each other, and each of the bottom surface of the connection rod, the bottom surface of the first cross rod and the bottom surface of the second cross rod is arranged with at least one of the plurality of connection beams.

15. The vehicle roof rack according to claim 1, wherein, each of the connection rod, the first connection end and the second connection end further defines a plurality of mounting holes to mount accessories.

16. The vehicle roof rack according to claim 15, wherein, the plurality of mounting holes are located on a top surface of the connection bar, a top surface of the first cross rod, and a top surface of the second cross rod;

the plurality of first connection portions are located on two symmetrical outer sides of the first cross rod, the plurality of second connection portions are located on two symmetrical outer sides of the second cross rod; and the two symmetrical outer sides of the first cross rod are located at two opposite sides of the top surface of the first cross rod, and the two symmetrical outer sides of the second cross rod are located at two opposite sides of the top surface of the second cross rod.

17. The vehicle roof rack according to claim 1, wherein, each of the first mounting end and the second mounting end is arranged with a mounting base extending towards a vehicle roof; the mounting base is arranged with a bracket bottom, and the bracket bottom is mounted to the vehicle roof.

18. The vehicle roof rack according to claim 17, wherein an end of the bracket bottom near the vehicle roof is bent to form two flat supports that are symmetrical to each other; and the flat supports are mounted on the vehicle roof.

19. A vehicle roof rack, comprising:
 a first cross rod, comprising a first connection end and a first mounting end;
 a connection rod;
 a second cross rod, comprising a second connection end and a second mounting end;
 wherein the second connection end is connected to the first connection end via the connection rod; the first connection end comprises a plurality of first connection portions, the connection rod defines a plurality of openings; any one of the plurality of openings is selectively aligned with and connected to any one of the plurality of first connection portions by a fastener, so as to adjust a distance between the first connection end and the second connection end.

20. The vehicle roof rack according to claim 19, wherein the second connection end comprises a plurality of second connection portions;
 the plurality of openings comprises at least one remaining opening other than the one of the plurality of openings connected to the one of the plurality of first connection portions; the at least one remaining opening is selectively aligned with and connected to the plurality of second connection portions by another fastener, so as to adjust the distance between the first connection end and the second connection end.

* * * * *